Nov. 2, 1954  M. P. WINTHER  2,693,261
MAGNETIC DISK CLUTCH
Filed Jan. 27, 1951  2 Sheets-Sheet 1
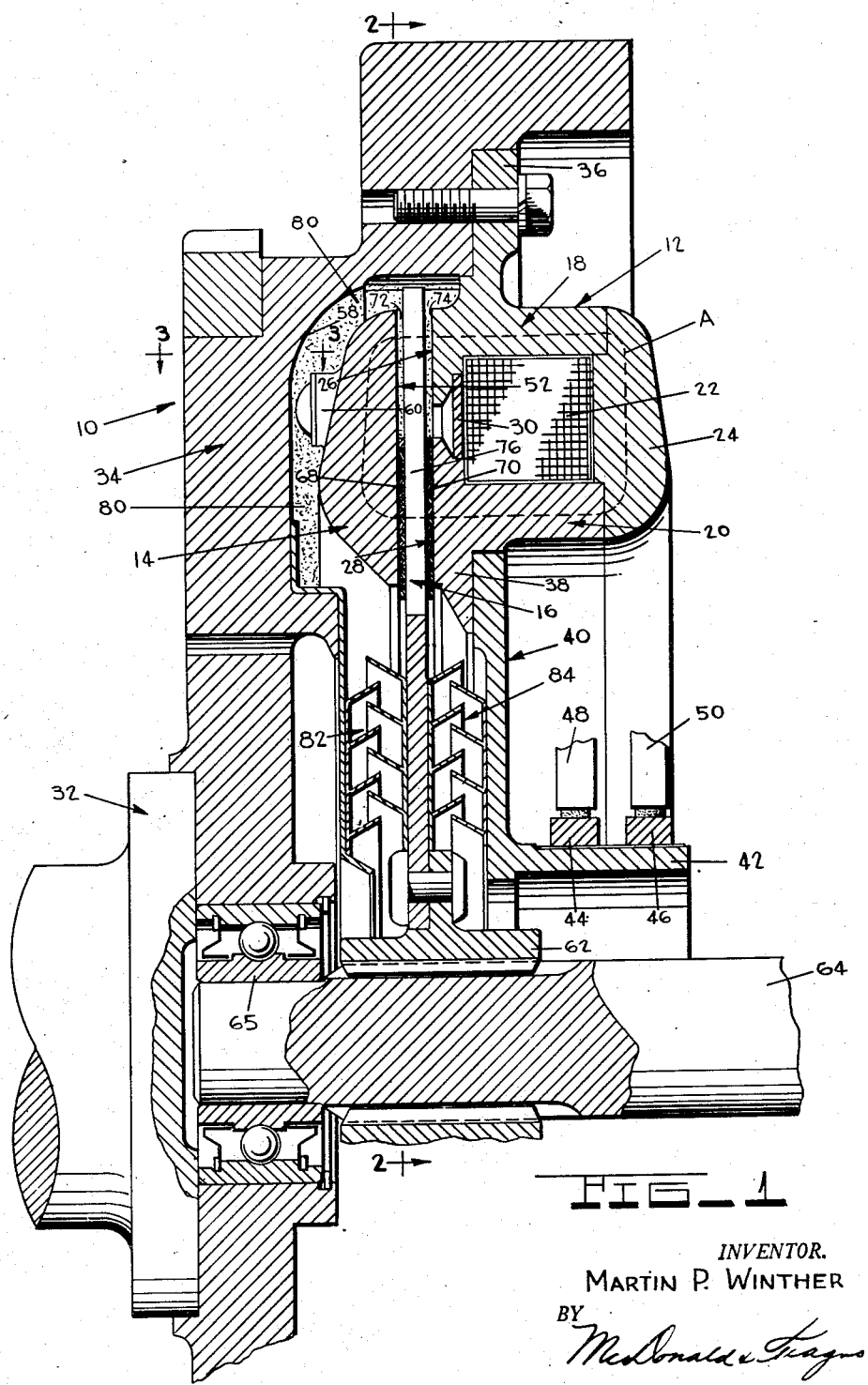
FIG_1
INVENTOR.
MARTIN P. WINTHER
BY
*McDonald & Frazer*
ATTORNEYS Nov. 2, 1954　　　M. P. WINTHER　　　2,693,261
MAGNETIC DISK CLUTCH
Filed Jan. 27, 1951　　　　　　　　2 Sheets-Sheet 2
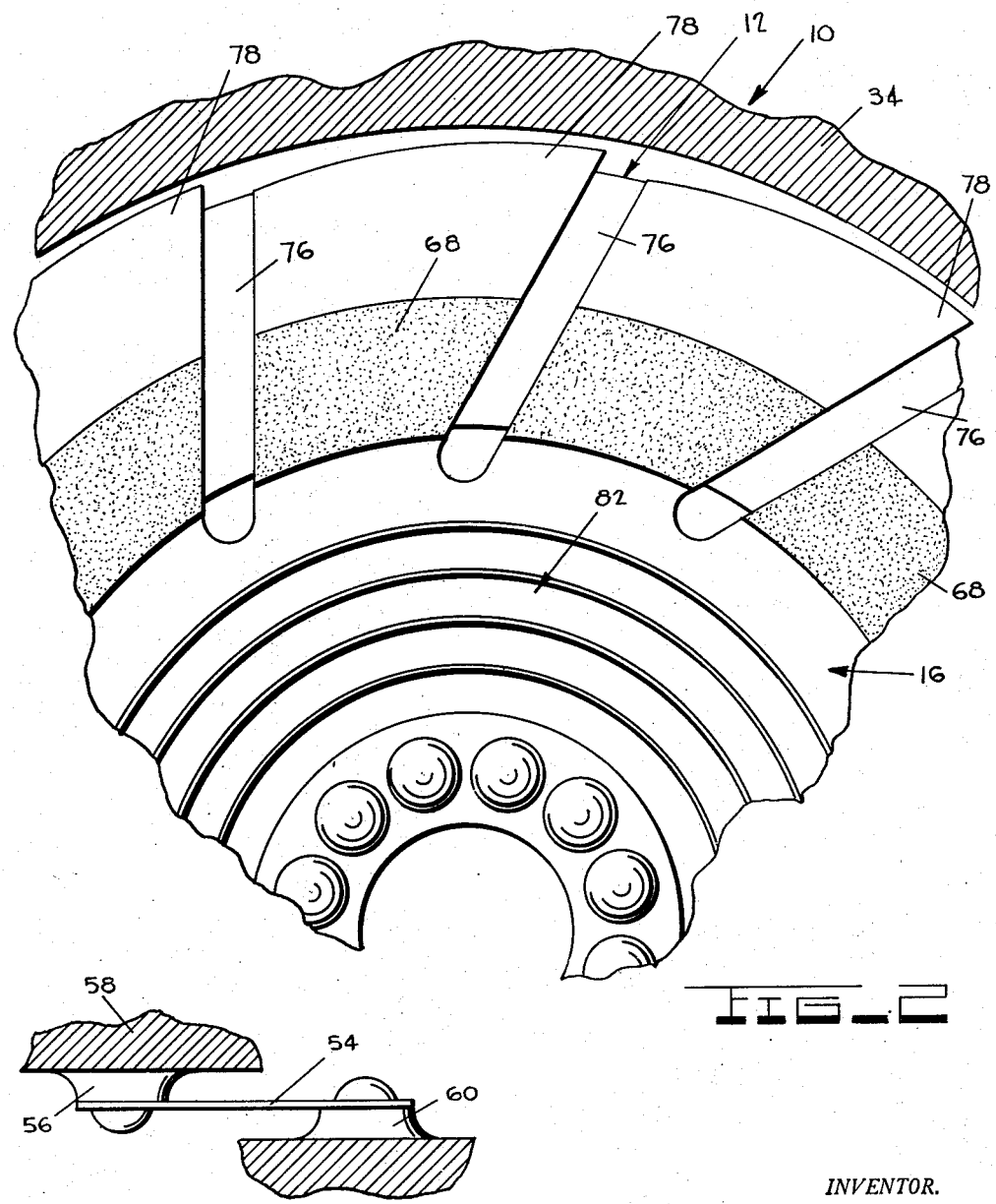
INVENTOR.
MARTIN P. WINTHER
BY
McDonald & Feagro
ATTORNEYS United States Patent Office 2,693,261
Patented Nov. 2, 1954

2,693,261

MAGNETIC DISK CLUTCH

Martin P. Winther, Gates Mills, Ohio, assignor, by mesne assignments, to Eaton Manufacturing Company, Cleveland, Ohio, a corporation of Ohio Application January 27, 1951, Serial No. 208,169

12 Claims. (Cl. 192—21.5)

This invention relates to electromagnetic apparatus and more particularly to an electromagnetic disk clutch.

Broadly the invention comprehends the provision of an electromagnetic disk clutch of conventional design employing a magnetic fluid mixture as a load transmitting medium between relatively rotatable members of the clutch and utilizing a low friction characteristic semi-magnetic lining between the members in a portion of the flux flow path generated therebetween.

Among the principal objects of the invention is the provision of an electromagnetic disk clutch combining the characteristics of a magnetic fluid mixture and a low friction semi-magnetic lining in transmitting and controlling torque transmission between relatively rotatable members of the clutch; that provides high torque transmitting capacity for a given weight without any appreciable wear; that provides for reliability to release loads under excessive torque; that provides a torque limiting device having constant breakaway characteristics; that provides through the utilization of a low friction semi-magnetic lining a predetermined gap into which the magnetic fluid mixture is drawn such that the shear force of the mixture in the gap substantially represents the capacity of the clutch to deliver torque; and that provides for the effective stirring of the magnetic mixture when the clutch is disengaged.

Other objects and advantages of the invention will appear from the following description taken in connection with the drawings forming a part of the specification, and in which:

Fig. 1 is a fragmentary vertical cross-sectionalized and partly broken away view of an electromagnetic disk clutch;

Fig. 2 is a cross-sectional view taken substantially along lines 2—2 of Fig. 1; and Fig. 3 is a cross-sectional view taken substantially along lines 3—3 of Fig. 1.

Similar reference characters indicate corresponding parts throughout the several views of the drawings.

This electromagnetic clutch was devised primarily for the purpose of providing a clutch of the type generally disclosed by Patent No. 2,519,449 in the utilization of a magnetic fluid mixture to provide for high torque transmitting with a minimum of resulting wear but having advantages thereover especially with regards to providing a torque limiting device wherein the breakaway characteristics thereof remain constant. Through the utilization of a low friction semi-magnetic lining interposed between relatively rotatable members of the clutch, only a small fraction of the total torque capacity of the clutch is represented thereby while at the same time the lining operates to separate the relatively rotatable members by a predetermined amount. This fixed amount represents the gap or space between the members in which the magnetic mixture operates upon establishment of a flux field between the members to effect a torque transmitting operation of the clutch. With the flux field being established the members are drawn toward one another and spaced apart a distance represented by the thickness of the lining. The flux field in its circuitous path between the relatively rotatable members is made to pass in one zone between the members and through the friction linings and in another zone between the members bridged by the magnetic mixture providing a torque transmitting medium therebetween.

As a result of providing a substantially fixed gap or space in which the magnetic mixture is to operate the shear value of the magnetic mixture in the gap is depended upon to hold a given torque and an assured breakaway is had under excessive torque.

Referring to the drawings for more specific details of the invention 10 represents generally an electromagnetic clutch comprising basically a pole member 12, an armature or pressure plate 14 and a clutch plate 16.

The pole member 12 constitutes the power input member of the clutch and includes a pair of annular radially spaced elements 18 and 20 respectively having an annular electromagnetic coil 22 clamped radially therebetween and an annular ring 24 securing the elements 18 and 20 together and enclosing the coil 22 between the members.

The elements 18 and 20 are provided on one side axially disposed from ring 24 with pole faces 26 and 28 respectively spaced apart a predetermined radial distance.

Whereas the elements 18 and 20, and ring 24 are made of a magnetic material, an annular ring 30 of non-magnetic material is arranged in the radial opening between the elements 18 and 20 to insure in its being non-magnetic against the flow of flux lines directly across the pole faces and as a face enclosure for the coil 22 to prevent the accumulation of magnetic mixture thereon.

Element 18 of the pole member is connected for driving relation with a power output shaft 32 by way of an end plate enclosure 34 bolted or otherwise suitably secured near its inner periphery to shaft 32 and near its outer periphery to a flange 36 forming a part of element 18.

Element 20 is secured near its inner periphery upon flange 38 thereof to an annular angle member 40, said member adapted to support on its axial portion 42 a pair of current conducting rings 44 and 46 respectively insulated from one another.

The rings 44 and 46 are adapted to be appropriately connected, not shown, to opposite ends of coil 22 so as to provide an electrical circuit for the coil supplied current as by way of brushes 48 and 50 engageable with the respective rings 44 and 46.

Armature 14 of annular shape is made of magnetic material and is disposed in axially spaced relation to the pole member 12 and presents an annular pole face 52 complementary in radial width to the width of the pole faces of elements 18 and 20.

A plurality of circumferentially spaced resilient straps 54 are connected between bosses 56 formed on the inner radial wall 58 and bosses 60 formed on the armature oppositely disposed from pole face 52 thereof, permitting of the support of armature 14 for rotation with shaft 32, end plate 34 and pole member 12 and axial relative movement thereto. By the armature 14 being so relatively moveable to pole member 12 the pole faces 26—28 and 52 are made to be approachable and retractable from one another as the energization or deenergization of coil 22 may dictate.

Clutch plate 16 extends radially between the armature and pole for operative engagement therewith and is bolted or otherwise suitably secured near its inner periphery to a hub member 62 which is in turn splined for axial movement on an output shaft 64, for the clutch. The shaft 64 is journalled for rotation internally of bearing 65 mounted internally of the hub of plate 34 adjacent the shaft 32.

The plate 16 is of such radial width as to extend radially outwardly beyond the pole faces 26 and 28 respectively of the pole member and armature into the outer circumferential confines of chamber 66 formed within the pole member 12 and end enclosure plate 34, the purpose of which will hereinafter appear.

Annular segments friction linings 68 and 70 of a semi-magnetic character are suitably secured upon opposite sides of the clutch plate and extend over a radial width corresponding to the width of pole face 28 or roughly one-half the radial width of pole face 52 of armature 14. Whereas lining 68 is engageable upon the inner one-half radial width of pole face 52 of the armature 14 the lining 70 is engageable across the entire face of pole face 28 of element 20 of pole member 12.

In so having the linings 68 and 70 engageable respectively with the inner radial portion of pole face 52 of the armature 14 and pole face 28 of element 20 annular air gaps or spaces 72 and 74 are assured respectively between the pole face of the armature and one side of clutch plate 16 and between the pole face 26 of element 18 of the pole member and the opposite face of the clutch plate even when the clutch plate is frictionally engaged between the pole member and armature.

A plurality of slots 76 displaced at an angle to true radial lines emanating from the axis of the clutch plate are provided in the clutch plate. These slots extend from the outer periphery of the plate toward the hub of the plate terminating at a radial point inwardly beyond the inner peripheral edge of pole faces 26 and 28 and friction linings 68 and 70, the purpose of which will hereinafter appear.

The outer periphery of the clutch plate is cut away from a true circumference between slots so as to provide scoops 78 adjacent the slots in relation to relative rotation of the clutch plate and end enclosure plate and pole member.

The slots 76 are of such width and extend axially through the plate so as to provide for the distribution and pumping of a magnetic fluid mixture 80 from its normal location in chamber 66 in an annular zone near the outer periphery of pole faces 26 and 28 and clutch plate 16.

As a means for insuring against the leakage of the magnetic mixture from chamber 66 of the clutch, two sets of labyrinth seals 82 and 84 respectively are disposed in conjunction with the clutch plate on opposite sides thereof. These seals are of the annular finger interleaved type and serve effectively to retain the mixture 80 in chamber 66.

The friction linings 68 and 70 are semi-magnetic in that they are made of a material of low friction characteristics impregnated with iron powder or the like so as to reduce the reluctance of the lining to magnetic lines of force. In so being provided with a low coefficient of friction the linings represent only a small fraction of the total torque capacity of the clutch.

Magnetic fluid mixture 80 is preferably of the dry solid lubricant and powdered iron variety such as iron powder and graphite of the type specifically defined in Findley Patent No. 2,519,449.

For the purpose of assuring an effective flow of flux between the pole member and armature, the armature and clutch plate are also made of suitable magnetic materials which together with the elements 18 and 20, ring 24, linings 68 and 70, and magnetic mixture 80 provide for flux flow in a path generally designated by dotted lines A.

Coil 22 is adapted to be adjusted slightly as may be desired by varying the excitation of current supplied thereto thus establishing the torque capacity limit of the clutch.

In a normal operation assuming the shaft 32 is rotated and current of an established amount is being supplied to the coil, the clutch will function as follows:

With rotation of shaft 32 the end enclosure plate 34, pole member 12 and armature 14 through connection therewith will be made to rotate simultaneously therewith. Assuming that the rotation is in the direction of arrow B a relative rotation will result between the enclosure plate 34, pole member 12 and armature 14, and clutch plate 16 with the result that scoops 78 on clutch plate 16 will dip into the chamber 66 near its outer periphery and thus scoop up mixture 80 and pump it into the slots radially toward the center of the clutch.

As the mixture 80 is pumped radially inwardly toward the center of the clutch and as a result of the coil 22 being energized the magnetic mixture will be drawn into air spaces 72 and 74 between the opposite face surfaces of clutch plate 16 and the respective pole faces of the armature and pole member. Simultaneously herewith the friction linings 68 and 70 frictionally engage the pole faces 52 and 28 respectively of the armature and element 20 of the pole member and thus establish the axial spacing of the clutch plate respectively to the armature and pole member. Even with the frictional engagement of linings 68 and 70 with the armature and pole member as the armature is magnetically axially drawn toward the pole member under the action of the magnetic flux only a small fraction of the total torque capacity of the clutch is transmitted thereby in view of the low coefficient of friction of the friction linings so provided.

Consequently with the low torque capacity produced by the friction linings the magnetic mixture will be magnetized to a point where the shear force of the mixture in the air spaces will substantially represent the torque capacity of the clutch.

By so gauging the spaces in which the magnetic mixture is drawn in the operation of transmitting torque between the pole member and armature, and clutch plate, a torque limiting device is produced wherein the breakaway characteristics of the clutch are not only known, but remain constant.

During a disengagement of the clutch when the coil is no longer supplied current the magnetic mixture is constantly and effectively stirred in that in addition to the scoops 78 operating to pump the magnetic mixture radially inwardly toward the center of the clutch the slots 76 operate to convey the mixture to a zone radially inwardly of the inner periphery of the pole faces of the armature and pole member. From here it is centrifugally propelled around the back of the armature to once again settle in the outer periphery of chamber 66 for subsequent recirculation between the armature and pole member under the action of the clutch plate and its slotted pumping means.

The mixture in its radial inward flow path also operates to lubricate the surfaces of the pole faces and the friction lining and thus lend operating life thereto.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An electromagnetic clutch comprising relatively rotatable magnetic members which are axially spaced apart, one of said members having annular radially in line extended radially spaced pole faces and the other member having an annular radially extended surface complementary to the radially extended pole faces of the first member, means for inductively magnetizing said members to actuate them towards one another, low coefficient of friction and low magnetic reluctance annular radially extended lining means, composed of a material of low friction characteristics impregnated with metallic particles for reducing the magnetic reluctance of the lining, on at least one of the members interposed in a portion of the space between the members and extending over a radial width complementary to the radial width of one pole face, and a magnetic fluid mixture in the portion of the space between the members in which there is no lining means and also between the frictionally engageable surface of one of the members and the lining means.

2. A clutch according to claim 1 wherein the lining means is disposed on the inner radial width portion of the member on which it is arranged.

3. A clutch according to claim 1 wherein the lining means spaces the friction surfaces of the relatively rotatable members apart the thickness of the lining means when the members are magnetically drawn toward one another such that the magnetic mixture is drawn and packed between the friction surfaces of the members not having the lining means therebetween to effect a power transmitting medium between the members.

4. An electromagnetic clutch comprising relatively rotatable driving and driven magnetic members which are axially spaced apart, one of said members having annular radially in line extended radially spaced pole faces and the other member having an annular radially extended surface complementary to the radially extended pole faces of the first member, means for inductively magnetizing said members to actuate them towards one another, low coefficient of friction and low magnetic reluctance annular radially extended lining means, composed of a material of low friction characteristics impregnated with metallic particles for reducing the magnetic reluctance of the lining, on at least one of the members interposed in a portion of the space between the members and extending over a radial width complementary to the radial width of one pole face, and a magnetic fluid mixture in the portion of the space between the members in which there is no lining means and also between the frictionally engageable surface of one of the members and the lining means.

5. A clutch according to claim 4 wherein the driving structure includes a pole member and an armature spaced apart and mounted for non-rotative but relative axial movement toward and away from one another, the driven structure includes a clutch plate interposed in the space between the pole member and armature, said armature and pole members providing opposed friction faces and wherein the pole member is the member having the radially spaced pole faces.

6. A clutch according to claim 5 wherein the friction lining is securely fixed to the clutch plate on opposite faces thereof over a radial width thereof constituting the radial width of one pole face of the pole member.

7. A clutch according to claim 6 wherein the friction lining is secured on the clutch plate for engagement with the inner annular pole face of the pole member and the inner annular portion of the armature complementary thereto.

8. An electromagnetic clutch comprising relatively rotatable magnetic members which are axially spaced apart, one of said members having annular radially in line extended radially spaced pole faces and the other member having an annular radially extended surface complementary to the radially extended pole faces of the first member, means for inductively magnetizing said members to actuate them towards one another, low coefficient of friction and low magnetic reluctance annular radially extended lining means, composed of a material of low friction characteristics impregnated with metallic particles for reducing the magnetic reluctance of the lining, on at least one of the members interposed in a portion of the space between the members and extending over a radial width complementary to the radial width of one pole face, a magnetic fluid mixture in the portion of the space between the members in which there is no lining means and also between the frictionally engageable surface of one of the members and the lining means, and means for pumping the mixture between the relatively rotatable members and lining means.

9. An electromagnetic clutch comprising relatively rotatable driving and driven magnetic members which are axially spaced apart, one of said members having annular radially in line extended radially spaced pole faces and the other member having an annular radially extended surface complementary to the radially extended pole faces of the first member, means for inductively magnetizing said members to actuate them toward one another, low coefficient of friction and low magnetic reluctance annular radially extended lining means, composed of a material of low friction characteristics impregnated with metallic particles for reducing the magnetic reluctance of the lining, on at least one of the members interposed in a portion of the space between the members and extending over a radial width complementary to the radial width of one pole face, a magnetic fluid mixture in a portion of the space between the members in which there is no lining means and also between the frictionally engageable surface of the members and one of the lining means, said driving structure including a pole member and an armature spaced apart and mounted for non-rotative but relative axial movement toward and away from one another, the driven structure includes a clutch plate interposed in the space between the pole member and armature and said armature and pole members providing opposed friction faces and the pole member being the member having the radially spaced pole faces, and pumping means in the clutch plate for pumping the mixture between the armature and pole member.

10. A clutch according to claim 9 wherein the pumping means is in the form of a plurality of circumferentially spaced slots in the clutch plate extending from open relation at the external periphery of the clutch plate angularly toward the axis thereof away from a true radius line and wherein the clutch plate is provided with a plurality of circumferentially spaced scoops on the external periphery thereof intermediate the slots.

11. An electromagnetic clutch comprising relatively rotatable driving and driven magnetic members which are axially spaced apart, one of said members having annular radially in line extended radially spaced pole faces and the other member having an annular radially extended surface complementary to the radially extended pole faces of the first member, means for inductively magnetizing said members to actuate them toward one another, low coefficient of friction and low magnetic reluctance annular radially extended lining means, composed of a material of low friction characteristics impregnated with metallic particles for reducing the magnetic reluctance of the lining, on at least one of the members interposed in a portion of the space between the members and extending over a radial width complementary to the radial width of one pole face, a magnetic fluid mixture in a portion of the space between the members in which there is no lining means and also between the frictionally engageable surface of the members and one of the lining means, said driving structure including a pole member and an armature spaced apart and mounted for non-rotative but relative axial movement toward and away from one another, the driven structure includes a clutch plate interposed in the space between the pole member and armature and said armature and pole members providing opposed friction faces and the pole member being the member having the radially spaced pole faces, and pumping means in the clutch plate for pumping the mixture between the armature and pole member, said pole member, armature and clutch plate being enclosed to provide a chamber in association therewith and said magnetic mixture being retained in the chamber for distribution between the pole member and armature.

12. A clutch according to claim 11 wherein the armature is mounted for axial movement relative to the pole member on an enclosure member securely affixed to the pole member enclosing the clutch plate and armature in a chamber formed within the pole member and enclosure member.

References Cited in the file of this patent

UNITED STATES PATENTS

| Number | Name | Date |
| --- | --- | --- |
| 2,057,954 | Judd | Oct. 20, 1936 |
| 2,135,126 | Harwood | Nov. 1, 1938 |
| 2,519,449 | Findley | Aug. 22, 1950 |
| 2,580,869 | Winther | Jan. 1, 1952 |
| 2,601,076 | Winther et al. | June 17, 1952 |

FOREIGN PATENTS

| Number | Country | Date |
| --- | --- | --- |
| 556,182 | Great Britain | Sept. 23, 1943 |
| 617,060 | Great Britain | Feb. 1, 1949 |